UNITED STATES PATENT OFFICE.

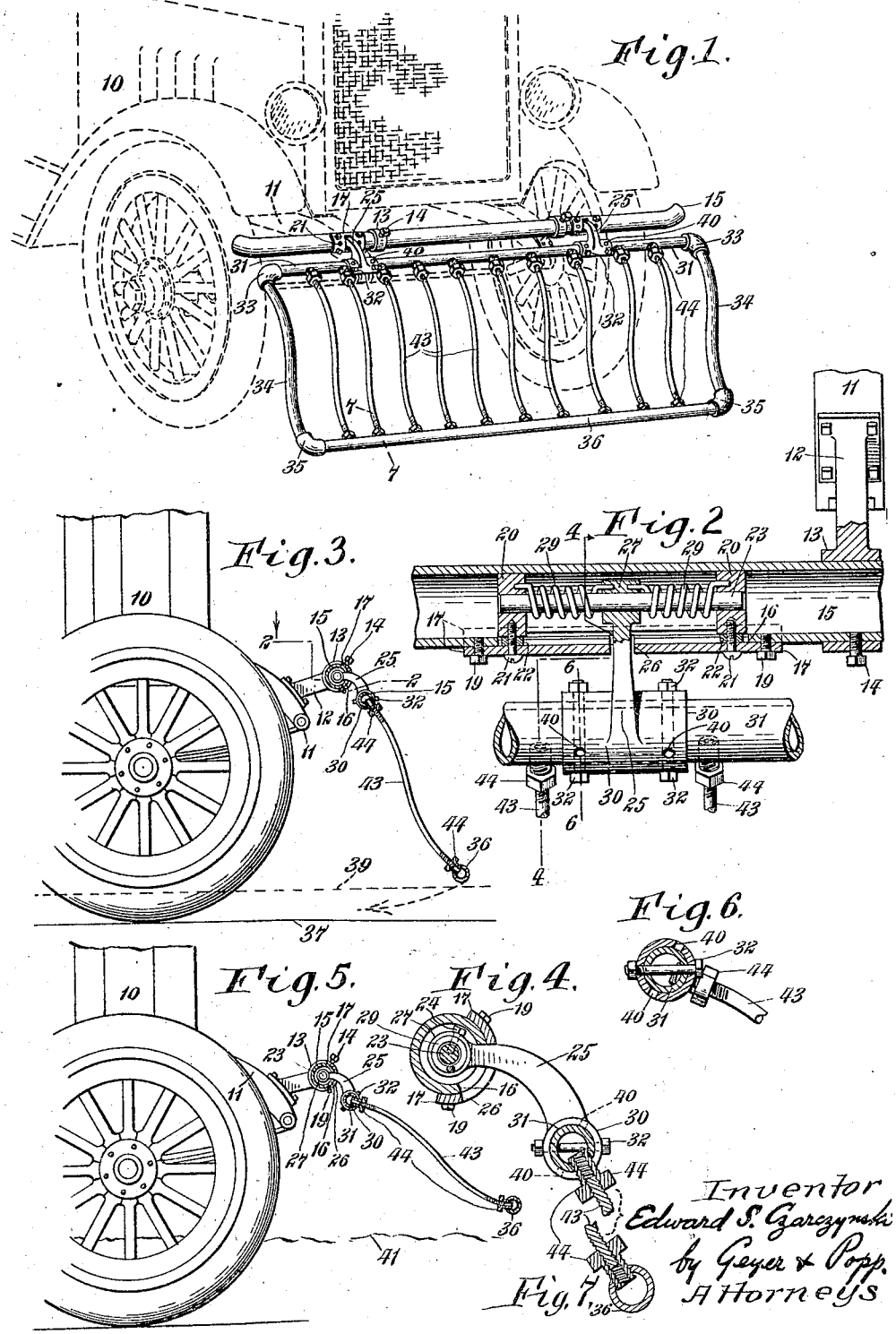

EDWARD S. CZARCZYNSKI, OF BUFFALO, NEW YORK.

VEHICLE FENDER.

1,419,959.            Specification of Letters Patent.     Patented June 20, 1922.

Application filed May 2, 1921. Serial No. 466,359.

*To all whom it may concern:*

Be it known that I, EDWARD S. CZARCZYNSKI, a citizen of the United States, residing in Buffalo, in the county of Erie and State of New York, have invented new useful Improvements in Vehicle Fenders, of which the following is a specification.

This invention relates to a device for preventing an automobile or other vehicle from injuring any pedestrians who may be in its pathway, and relates more particularly to a device for preventing a pedestrian from passing under the chassis of the vehicle and being crushed under the wheels or under parts of the same.

One of the objects of the invention is to provide a fender which will also act in the capacity of an ordinary automobile bumper for preventing injury when one automobile collides with another. A further object of the invention is to provide a means of adjusting the fender at a normally higher position so that the same is not interfered with when the vehicle, in the winter time, passes through deep snow drifts. A still further object of the invention is to properly encase all of the moving working parts, which require lubrication and which would otherwise be easily clogged up or otherwise rendered inoperative.

Further objects and advantages will appear more clearly upon an examination of the following description and appended drawings wherein:—

Figure 1 is a perspective view of the vehicle fender showing the same as applied to the front end of an ordinary automobile. Figure 2 is a greatly enlarged, substantially horizontal transverse section through the upper part of the vehicle fender and taken on the line 2—2, Fig. 3. Figure 3 is a vertical longitudinal section through the fender showing the same in the one normal position illustrated in Fig. 1. Figure 4 is a somewhat enlarged vertical longitudinal section through the upper part of the fender and taken on line 4—4, Fig. 2. Figure 5 is a vertical, longitudinal section through the entire fender simular to Fig. 3, but with said fender in a different normal position. Figure 6 is a somewhat enlarged, vertical, longitudinal section through the fender bar showing the means of adjusting the fender and taken on line 6—6, Fig. 2. Figure 7 is a somewhat enlarged, vertical, longitudinal section through the fender rail.

Similar characters of reference refer to like parts throughout the several views.

10 represents the front end of a typical vehicle to which the fender is secured or attached. Secured to the usual longitudinal frame bars 11 of said vehicle are a pair of upwardly and forwardly projecting brackets 12 which are provided at their forward ends with integral sleeves or collars 13. Disposed horizontally and transversely of the vehicle and retained within the said collars 13 of said brackets by suitable set screws 14 or otherwise, is a comparatively heavy supporting tube 15. The opposite ends of the latter are preferably curved rearwardly somewhat, in the manner of an automobile bumper, inasmuch as the same acts in a dual capacity, i.e., it forms a component part of the automobile fender and at the same time it acts as a bumper for preventing injury to the automobile when the latter collides with another vehicle, telegraph post or other like ponderous obstacle.

Formed in the lower, front peripheral face of said supporting tube 15, are two rectangular apertures 16, which are normally adapted to be covered by suitable semi-cylindrical sleeves or covering plates 17 detachably secured to the supporting tube 15 by suitable cap screws 19. Removably arranged within the bore of said supporting tube are two thick washer-shaped, bearing blocks 20 each of which is suitably held in position by a screw 21 which passes through the adjacent covering plate 17. A filler washer 22 is preferably interposed between each of said bearing blocks and the inner adjacent face of the covering plate, so that each of the screws 21 may be screwed up tightly and each bearing block firmly drawn toward said cover plate 17 and thus, in effect, permanently clamped thereto. Two stub shafts 23 are disposed coaxially within the supporting tube, each of the same being journaled at opposite ends within the bores of the companion set of bearing blocks 20. Secured centrally to each stub shaft by a suitable set screw 24 or otherwise, is a fender arm 25, the same extending downwardly and forwardly from its companion stub shaft and passing through a suitable arcuate slot 26 formed centrally in the covering plate 17. Two suitable holes are drilled longitudinally into the opposite faces of the upper hub 27 of said fender arm, the same being arranged to receive the inner ends of a pair of torsion springs 29, which surround the stub shaft and are suitably secured at their outer ends to the aforesaid bearing blocks 20.

The lower front end of each fender arm 25 is provided with a large hub 30 which receives a tubular horizontal, transverse fender bar 31 and is adjustably secured thereto by a diametrical bolt 32 which passes through both said fender bar and said large hub 30. Secured to the outer, lateral ends of said tubular fender bar by means of L-shaped gas-pipe connections 33 or otherwise are a pair of tubular fender side bars 34 which normally extend downwardly and forwardly from said fender bar 31. The lower ends of said side bars 34 are also provided with L-shaped gas-pipe connections 35 or otherwise and are thereby secured to a horizontal transverse fender rail 36. It is preferred that the normal position of this fender rail (see Fig. 3) be sufficiently above the surface of the roadway 37, so that the same will not touch the ground if a blow-out occurs in one of the front tires of the vehicle or the same are otherwise deflated. In this case the ground line would be located, (relatively to the vehicle) in a position indicated by dotted lines 39. During the winter time, it is preferable to have the fender raised still higher so as to properly clear the snow drifts, etc. For this purpose, an additional or adjustment hole 40 (see Fig. 6) is drilled diametrically through the hub 30 of the fender arm 25. Thus by removing the diametrical, adjusting bolt 32 and then passing the same through the aforesaid adjustment hole 40 of the fender arm hub (and also through the same single diametrical hole in the fender bar 31) the whole fender may have its normal position raised, relatively to the fender arm 25, as shown in Fig. 5, in which figure the upper surface of a snow drift is shown by the wavy line 41. In both cases, however, the whole fender together with the pairs of fender arms 25 are normally held forwardly in the position shown in the drawings by the resilient pressure of the torsion springs 29, said springs acting to thrust the fender arms in their extreme forward limit against the transverse ends or abutments of the slots 26 as illustrated in Figs. 3, 4 and 5. If a pedestrian happens to inadvertently be in the immediate pathway of the vehicle while the latter is moving forwardly, said pedestrian will be scooped up by the fender.

Arranged parallel to the side rails 34 and spaced transversely at equal distances apart are a number of fender pickets 43 whose opposite ends are provided with external screw threads. The total or overall length of each one of these pickets is less than the intervening distance between the fender bar 31 and the fender rail 36. Arranged at the opposite ends of each fender picket are bushings 44 whose internal threads engage or mesh with the aforesaid external threads of each of said pickets. The external thread of each of the upper bushings meshes with a suitable, internally-threaded hole in the fender bar 31 while the external thread of each of the lower bushings meshes with a suitable, internally-threaded hole in the fender rail 36. This construction permits of the replacement of any one or more of said pickets, in case of fracture, without disturbing the fender as a whole. This is accomplished by merely screwing to companion bushings of each fender picket outwardly or toward each other and out of engagement with their internally threaded holes in the fender bar and fender rail respectively, thus permitting the companion fender picket to be removed from the fender proper.

The general operation of the fender is as follows:

Should a pedestrian inadvertently step into the immediate path of the vehicle while the latter is moving, said pedestrian will be scooped up on the fender and carried along until the driver of the vehicle has had time enough to bring said vehicle to a stop. In the wintertime to prevent interference of the fender with snow drifts, etc., the adjusting bolt 32 is removed from the position of Figs. 1, 2, 3, 4 and 6 and inserted through the hole 40 of the fender arm 25, so that the normal or extreme upward position of the fender is as shown in Fig. 5. On the other hand, should the vehicle come in contact with a heavy object such as another vehicle, a telegraph post or the like, then the whole fender will swing rearwardly (about the stub shaft 23 as an axis) and under the supporting tube 15, which latter is then able to act in the capacity of an ordinary automobile bumper. Normally, however, the fender is resiliently but forcibly held in its forward position by the torsion springs 29. These springs together with the other more delicate parts of the apparatus are encased or contained within the bore of said supporting tube 15 so as to permit of properly lubricating the same without any liability of the same becoming caked up with dust and mud.

Inasmuch as no working parts are exposed, it follows that the whole fender is readily cleaned or washed. Should an inspection of the working parts be desired, it is merely necessary to remove the cap screws 19 whereupon all the vitals of the fender are exposed to view. Should any one of the fender pickets 43 become fractured, it is merely necessary to screw backwardly the bushings 44 at opposite ends of said picket and then remove the said picket together with its two bushings laterally out from the fender proper. The whole apparatus is easily fastened to any available vehicle; it is not likely to become injured by collision with another vehicle; it is easy to keep cleaned and is readily inspected and the replacement of any fractured part is rendered quite easy. Furthermore, the adjustment of the fender proper relatively to the vehicle is provided so that the fender does not have to be removed in the winter time. Also this improved fender serves to absorb the shock when a person comes in contact therewith.

I claim as my invention:

1. A vehicle fender comprising a supporting tube, a fender arm journaled within said supporting tube, and a helical spring arranged within said supporting tube and connected at opposite ends respectively to said arm and said tube.

2. A vehicle fender comprising a supporting tube, a bearing block arranged within said tube, a fender arm pivotally connected with said bearing block, and a spring connected at opposite ends to said bearing block and to said fender arm.

3. A vehicle fender comprising a supporting tube, a bearing block arranged within said tube, a stub shaft journaled in said bearing block coaxially with said supporting tube, a fender arm secured to said stub shaft, and a helical spring coiled around said stub shaft and connected at its opposite ends to said fender arm and to said bearing block.

4. A vehicle fender comprising a supporting tube having an aperture in its forward face, a bearing block and a stub shaft adapted to be passed through the said aperture and secured internally to said supporting tube, a fender arm connected with said stub shaft and projecting forwardly through the aperture in said supporting tube, and a resilient connection within said supporting tube and connecting the same with said fender arm.

5. A vehicle fender comprising a stub shaft provided at opposite ends with bearing blocks, a supporting tube provided with an aperture whose maximum length is equal to the length of said stub shaft and whose maximum width is equal to the width of said bearing blocks, a fender arm secured to said stub shaft intermediately thereof, a pair of helical springs disposed around said stub shafts on both sides of said fender arm, and a covering plate adapted to be bolted to said supporting tube over the aperture thereof and having an arcuate slot substantially equal to the width of said fender arm.

6. A vehicle fender comprising a supporting tube having an aperture, a stub shaft provided at opposite ends with bearing blocks and adapted to be passed through the said aperture of said supporting tube, a covering plate adapted to cover said aperture and secured to said bearing blocks, a fender arm secured to said stub shaft, and resilient means for holding the said fender arm upwardly.

7. A vehicle fender comprising a supporting tube secured to the front end of said vehicle and adapted to act as a fixed bumper when colliding with other vehicles, a fender frame pivotally secured to said supporting tube and normally resiliently pressed forwardly of the same but capable of swinging back and under said supporting tube.

8. A vehicle fender comprising a supporting tube secured to the front end of said vehicle and adapted to act as a fixed bumper when colliding with other vehicles, a covering plate provided with a forwardly and downwardly projecting slot, a fender arm extending through said slot and having its one end journaled within said supporting tube, and a fender secured to said fender arm and adapted to swing back and under said supporting tube.

9. A vehicle fender comprising a supporting tube, a fender pivotally connected with said supporting tube and resiliently forced upwardly and forwardly with respect thereto, and means for limiting the upper limit of movement of said fender.

10. A vehicle fender comprising a supporting tube, a fender arm having its upper end projecting into said supporting tube and journaled thereto and having a sleeve at its lower end provided with a plurality of circumferentially arranged adjustment holes, a fender bar arranged within the said sleeve of said fender arm and provided with an adjustment hole which is adapted to register with any desired one of the aforesaid holes in said fender arm sleeve.

11. A vehicle fender comprising a transverse fender bar, a transverse fender rail, a longitudinal fender picket connected at one end to one of the aforesaid transverse fender members and externally threaded at the other end and extending toward but reaching short of said other transverse fender member, a bushing adapted to engage with the latter transverse fender member and provided with internal screw threads which mesh with the external screw thread on said fender picket.

12. A vehicle fender comprising a transverse fender bar, a transverse fender rail, a pair of internally and externally threaded bushings adapted to screw longitudinally into said bar and said rail respectively, and a fender picket provided with external screw threads at its opposite ends arranged to engage with the bores of said bushings, the overall length of said picket being less than the intervening distance between said fender bar and said fender rail.

EDWARD S. CZARCZYNSKI.